United States Patent
Ellwein

(10) Patent No.: US 10,666,040 B2
(45) Date of Patent: May 26, 2020

(54) MACHINE HAVING AT LEAST ONE MOTOR AND ONE MACHINE PROTECTION CIRCUIT

(71) Applicant: KRIWAN Industrie-Elektronik GmbH, Forchtenberg (DE)

(72) Inventor: Christian Ellwein, Schwäbisch Hall (DE)

(73) Assignee: KRIWAN INDUSTRIE-ELEKTRONIK GMBH, Forchtenberg (DE)

( * ) Notice: Subject to any disclaimer, the term of this patent is extended or adjusted under 35 U.S.C. 154(b) by 295 days.

(21) Appl. No.: 15/285,681

(22) Filed: Oct. 5, 2016

(65) Prior Publication Data

US 2017/0098932 A1 Apr. 6, 2017

(30) Foreign Application Priority Data

Oct. 5, 2015 (DE) .................. 10 2015 116 845

(51) Int. Cl.
| | |
|---|---|
| *H02H 7/08* | (2006.01) |
| *H02K 11/20* | (2016.01) |
| *H02P 29/64* | (2016.01) |
| *H02H 1/00* | (2006.01) |

(52) U.S. Cl.
CPC ............ *H02H 7/08* (2013.01); *H02H 1/0007* (2013.01); *H02K 11/20* (2016.01); *H02P 29/64* (2016.02)

(58) Field of Classification Search
CPC .............. F24F 11/0009; F24F 11/0086; F24F 2011/006; F25B 2600/025; F25B 2600/111
See application file for complete search history.

(56) References Cited

U.S. PATENT DOCUMENTS

| | | | | |
|---|---|---|---|---|
| 6,105,607 A | * | 8/2000 | Caise ................... | F16K 31/402 137/487.5 |
| 7,044,158 B1 | * | 5/2006 | Huff .................... | F16K 37/0091 137/552 |
| 7,893,992 B2 | * | 2/2011 | Vittu ..................... | G03B 13/36 348/357 |
| 2005/0046595 A1 | * | 3/2005 | Blyth .................... | G08G 1/095 340/908 |
| 2005/0156746 A1 | * | 7/2005 | Remsburg ............... | F24F 11/30 340/602 |
| 2008/0115512 A1 | * | 5/2008 | Rizzo ................. | B60H 1/00428 62/134 |

(Continued)

*Primary Examiner* — Shawki S Ismail
*Assistant Examiner* — Zoheb S Imtiaz
(74) *Attorney, Agent, or Firm* — Renner Kenner Greive Bobak Taylor & Weber

(57) ABSTRACT

A machine, specifically a pump, a compressor, an agitator or a hoist, includes at least one motor and one machine protection circuit that includes a measurement device having at least one sensor for monitoring at least one parameter of the machine and includes an analysis device for analysing the parameters measured by the sensor and for activating a machine protection relay for switching off the machine. A switch cabinet positioned away from the machine is provided, and the machine protection circuit is spatially separated by the measurement device being arranged in the machine, and by the analysis device and the machine protection relay being arranged in the switch cabinet.

32 Claims, 1 Drawing Sheet

(56) References Cited

U.S. PATENT DOCUMENTS

| | | | | |
|---|---|---|---|---|
| 2009/0038696 A1* | 2/2009 | Levin | F04B 49/002 | 137/565.11 |
| 2011/0193556 A1* | 8/2011 | Paci | G01R 33/07 | 324/251 |
| 2012/0073200 A1* | 3/2012 | Bostyn | E06B 9/68 | 49/28 |
| 2012/0327539 A1* | 12/2012 | Washburn | H01H 61/002 | 361/22 |
| 2013/0269432 A1* | 10/2013 | Brutschin | G01F 23/44 | 73/313 |
| 2016/0245559 A1* | 8/2016 | Yang | F25B 31/006 | |

* cited by examiner

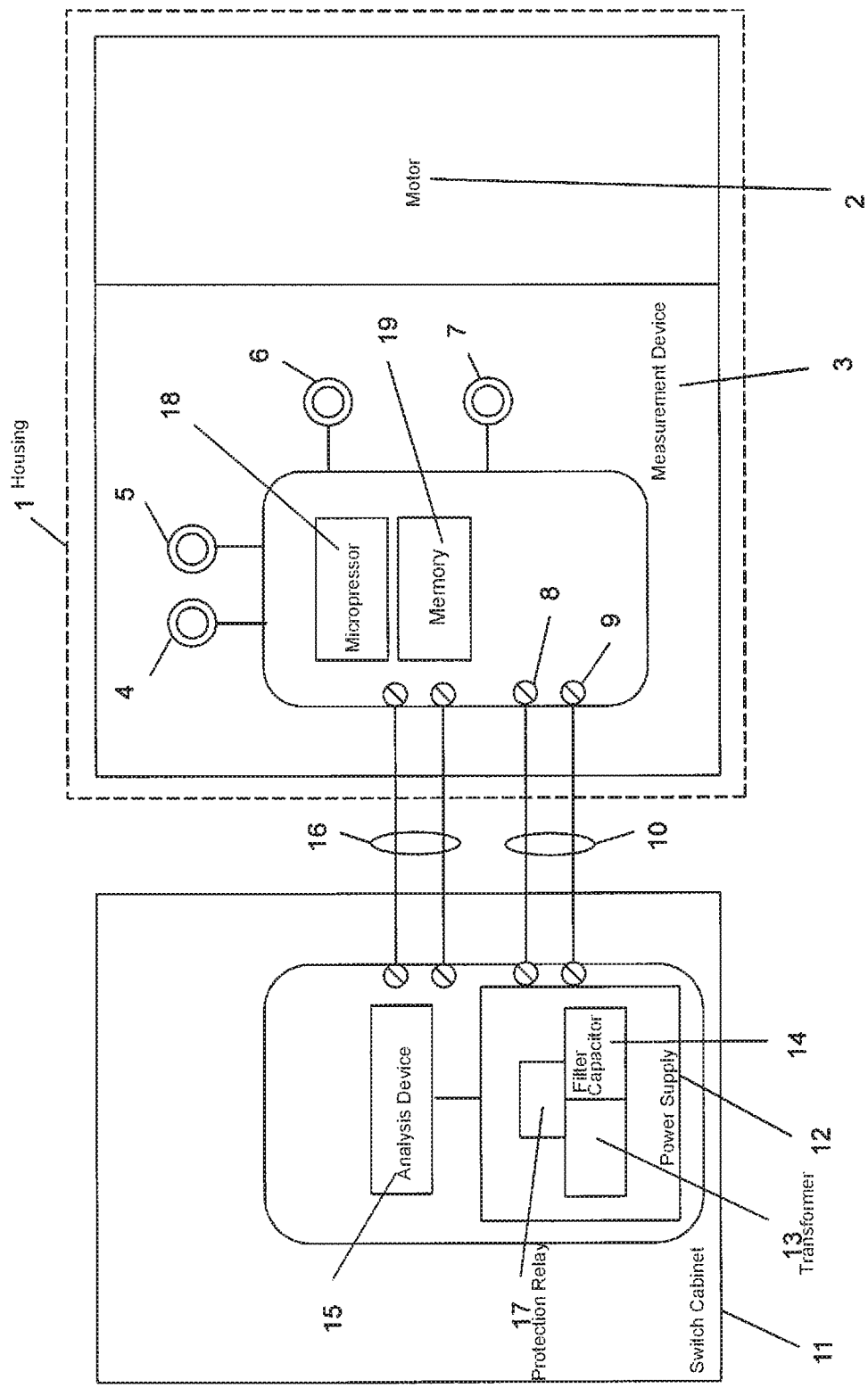

MACHINE HAVING AT LEAST ONE MOTOR AND ONE MACHINE PROTECTION CIRCUIT

TECHNICAL FIELD

The invention relates to a machine, specifically a pump, a compressor, an agitator or a hoist, comprising at least one motor and one machine protection circuit.

BACKGROUND

Machine protection circuits are conventionally equipped with a sensor for monitoring at least one parameter of the machine, for example the current, the voltage or the temperature, in particular of the motor. The parameter measured by the sensor is analysed by means of an analysis device and, if predetermined limit values are exceeded, is used to activate a machine protection relay by means of which the machine/motor can be switched off.

For example, a protection device for a refrigeration compressor motor for monitoring thermal overload is known from EP 2 187 494 A2, comprising a sensor circuit and a trigger apparatus, the trigger apparatus comprising an analysis device designed to generate an output signal for the trigger apparatus on the basis of the sensor signal. In the process, the output signal is for example used to control a motor protection relay in order to stop the power supply. The machine protection relay conventionally housed in the machine has proven effective in switching off the machine or the motor in a timely manner and can thus in particular prevent damage to the machine or to the motor.

However, machine protection relays take up a relatively large amount of installation space in the machine, with even more space required if the machine is used in areas subject to explosion hazard.

SUMMARY

The problem addressed by the present invention is therefore that of developing a machine protection circuit that takes up a smaller amount of installation space in the machine.

According to the invention, this problem is solved by the features of claim 1 by the machine, which is formed as a pump, a compressor, an agitator or a hoist, being equipped with at least one motor and one machine protection circuit, wherein the machine protection circuit comprises a measurement device having at least one sensor for monitoring at least one parameter of the machine and comprises an analysis device, wherein the analysis device analyses the parameter measured by the sensor and activates a machine protection relay for switching off the machine if necessary. Furthermore, a switch cabinet positioned away from the machine is provided, and the machine protection circuit is spatially separated such that the measurement device having the at least one sensor is arranged in the machine and the analysis device and the machine protection relay are arranged in the switch cabinet.

This has in particular the advantage that the relatively large machine protection relay for switching off the machine is stored remotely and so does not take up any installation space inside the machine.

The dependent claims relate to further embodiments of the invention.

If the machine comprises a power supply having a filter capacitor, the filter capacitor can also be housed in the switch cabinet, since this component part is also a relatively large one.

In uses in areas subject to explosion hazard, both the machine protection relay and the filter capacitor are critical component parts that must be particularly protected. This problem can be avoided by storing both of these components parts remotely.

Furthermore, the temperatures in pumps, compressors, agitators and hoists are often quite high. Since the filter capacitor and the machine protection circuit age faster at higher temperatures, their serviceable life can be lengthened considerably by storing them remotely in the switch cabinet.

According to a further embodiment of the invention, the measurement device comprises a microprocessor, which is connected to the sensor and the analysis device, for transmitting a measurement signal recorded by the sensor. In the process, the measurement signal can be configured and transmitted in particular as a digitally modulated signal. By this means, in particular specific current, voltage, conductivity or temperatures values can be transmitted. Furthermore, if the microprocessor is connected to a memory for logging measurement signals, important information regarding the functioning of the machine can be retrieved in the event of any service or repair works. Signals are transmitted between the measurement device and the analysis device expediently via a cable, in particular a two- or four-wire cable. In particular, a current sensor, a voltage sensor, a conductivity sensor or a temperature sensor can be used as the sensor. Expediently, the parameters of the machine or of the motor that are to be monitored are those that can provide a reliable signal indicating a critical state of the machine.

Furthermore, it is advantageous if the power supply as a whole, i.e. including the filter capacitor, in particular also the transformer, is housed in the switch cabinet.

BRIEF DESCRIPTION OF THE DRAWINGS

FIG. 1 shows a block diagram of the machine according to the invention having a motor and a machine protection circuit.

DETAILED DESCRIPTION

Reference numeral 1 indicates a housing of a pump, a compressor, an agitator or a hoist. Provided inside the housing 1 are inter alia an (electric) motor 2 and a measurement device 3, the measurement device comprising one or more sensors 4 to 7 for monitoring at least one parameter of the machine, in particular of the motor 2. Said sensors can be in particular current and/or voltage sensors for monitoring the current of the motor or the voltage of the motor, or can be for example a temperature sensor that monitors for example the winding temperature of the motor 2. However, depending on the use, other sensors can also be provided, such as a conductivity sensor.

Power is supplied to the measurement device 3 by means of terminals 8, 9 on the measurement device 3 that are connected by means of a cable 10 to a power supply 12 housed in a switch cabinet 11. The power supply 12 comprises all the component parts necessary for providing the low voltage, for example 5V DC, required by the measurement device, such as in particular a transformer 13 and a filter capacitor 14. An analysis device 15 that is connected to the measurement device 3 by means of a cable 16 for transmitting the measurement signals recorded by the sensors 4 to 7 is also provided in the switch cabinet 11. If the measurement signal to be transmitted is configured as a digitally modulated signal, in particular the magnitude of the measurement signal can also be transmitted in addition to the type of measurement signal. The transmitted measurement signals are analysed in the analysis device 15, the measurement values being monitored, in the simplest case, with respect to their exceeding or falling below a predetermined desired range and a machine protection relay 17 for switching off the machine or the motor 2 being activated if necessary. The machine protection relay 17 is also housed in the switch cabinet 11. Depending on the information content of the transmitted measurement signals, for example the rates of change of the measurement signals may also be taken into account during the analysis.

The particular advantage of the machine shown is that in particular the machine protection relay 17, which takes up a comparably large amount of installation space, is housed in the switch cabinet 11 and not inside the housing 1. This also applies to the proportionally large filter capacitor 14. The necessary installation space can therefore be reduced in the machine 1, which is a pump, a compressor, an agitator or a hoist. Furthermore, the motor protection relay 17 and the filter capacitor 14 are also temperature-sensitive component parts, the serviceable lives of which are considerably shortened at high temperatures, which are often prevalent inside the housing 1.

If the pump, the compressor, the agitator or the hoist is used in areas subject to explosion hazard, the necessary protective measures can be considerably reduced, since the particularly vulnerable component parts, specifically the machine protection circuit 17 and the filter capacitor 14, are stored remotely in the switch cabinet 11.

The measurement device 3 remaining inside the housing 1 of the machine takes up a comparably small amount of installation space. However, said measurement device can comprise in particular a microprocessor 18 for transmitting the measurement signals recorded by the sensors 4 to 7 to the analysis device 15. According to a further embodiment of the invention, the microprocessor 18 can be connected to a memory 19 for logging the measurement signals such that that the loading of the machine over the course of the stored period can be read out in the event of service or repair works to the machine.

The invention claimed is:
1. An apparatus comprising:
a compressor including a compressor housing having at least one motor therein;
a machine protection circuit including a measurement device and an analysis device, the measurement device being in the compressor housing and having at least one sensor for monitoring at least one parameter of the compressor, and the analysis device analysing the parameters measured by the sensor and activating a machine protection relay for switching off the compressor,
wherein a switch cabinet is positioned away from the compressor housing, and the analysis device and the machine protection relay are arranged in the switch cabinet, and wherein the measurement device further includes a microprocessor in the compressor housing and connected to the at least one sensor and to the analysis device for transmitting a measurement signal recorded by the at least one sensor, and wherein the measurement signal is configured as a digitally modulated signal.

2. The apparatus according to claim 1, wherein the measurement device and the analysis device are connected by means of a cable.
3. The apparatus according to claim 1, wherein the microprocessor comprises at least one memory for logging measurement signals.
4. The apparatus according to claim 1, wherein the at least one sensor is a current sensor, a voltage sensor, a conductivity sensor or a temperature sensor.
5. The apparatus according to claim 1, wherein the power supply for the compressor is also housed in the switch cabinet.
6. The apparatus according to claim 1, wherein the power supply comprises a filter capacitor.
7. The apparatus according to claim 1, wherein a transformer for generating a voltage suitable for the measurement device is also housed in the switch cabinet.
8. The apparatus of claim 1, wherein the power supply includes a filter capacitor.
9. An apparatus comprising:
a pump including a pump housing having at least one motor therein;
a machine protection circuit including a measurement device and an analysis device, the measurement device being in the pump housing and having at least one sensor for monitoring at least one parameter of the pump, and the analysis device analysing the parameters measured by the sensor and activating a machine protection relay for switching off the pump,
wherein a switch cabinet is positioned away from the pump housing, and the analysis device and the machine protection relay are arranged in the switch cabinet, and wherein the measurement device further includes a microprocessor in the pump housing and connected to the at least one sensor and to the analysis device for transmitting a measurement signal recorded by the at least one sensor, and wherein the measurement signal is configured as a digitally modulated signal.
10. The apparatus according to claim 9, wherein the measurement device and the analysis device are connected by means of a cable.
11. The apparatus according to claim 9, wherein the microprocessor comprises at least one memory for logging measurement signals.
12. The apparatus according to claim 9, wherein the at least one sensor is a current sensor, a voltage sensor, a conductivity sensor or a temperature sensor.
13. The apparatus according to claim 9, wherein the power supply for the pump is also housed in the switch cabinet.
14. The apparatus according to claim 9, wherein the power supply comprises a filter capacitor.
15. The apparatus according to claim 9, wherein a transformer for generating a voltage suitable for the measurement device is also housed in the switch cabinet.
16. The apparatus of claim 9, wherein the power supply includes a filter capacitor.
17. An apparatus comprising:
an agitator including an agitator housing having at least one motor therein;
a machine protection circuit including a measurement device and an analysis device, the measurement device being in the agitator housing and having at least one sensor for monitoring at least one parameter of the agitator, and the analysis device-analysing the parameters measured by the sensor and activating a machine protection relay for switching off the agitator, wherein a switch cabinet is positioned away from the agitator housing, and the analysis device and the machine protection relay are arranged in the switch cabinet, and wherein the measurement device further includes a microprocessor in the agitator housing and connected to the at least one sensor and to the analysis device for transmitting a measurement signal recorded by the at least one sensor, and wherein the measurement signal is configured as a digitally modulated signal.

18. The apparatus according to claim 17, wherein the measurement device and the analysis device are connected by means of a cable.

19. The apparatus according to claim 17, wherein the microprocessor comprises at least one memory for logging measurement signals.

20. The apparatus according to claim 17, wherein the at least one sensor is a current sensor, a voltage sensor, a conductivity sensor or a temperature sensor.

21. The apparatus according to claim 17, wherein the power supply for the agitator is also housed in the switch cabinet.

22. The apparatus according to claim 17, wherein the power supply comprises a filter capacitor.

23. The apparatus according to claim 17, wherein a transformer for generating a voltage suitable for the measurement device is also housed in the switch cabinet.

24. The apparatus of claim 17, wherein the power supply includes a filter capacitor.

25. An apparatus comprising:
a hoist including a hoist housing having at least one motor therein;
a machine protection circuit including a measurement device and an analysis device, the measurement device being in the hoist housing and having at least one sensor for monitoring at least one parameter of the hoist, and the analysis device analysing the parameters measured by the sensor and activating a machine protection relay for switching off the hoist,
wherein a switch cabinet is positioned away from the hoist housing, and the analysis device and the machine protection relay are arranged in the switch cabinet, and wherein the measurement device further includes a microprocessor in the hoist housing and connected to the at least one sensor and to the analysis device for transmitting a measurement signal recorded by the at least one sensor, and wherein the measurement signal is configured as a digitally modulated signal.

26. The apparatus according to claim 25, wherein the measurement device and the analysis device are connected by means of a cable.

27. The apparatus according to claim 25, wherein the microprocessor comprises at least one memory for logging measurement signals.

28. The apparatus according to claim 25, wherein the at least one sensor is a current sensor, a voltage sensor, a conductivity sensor or a temperature sensor.

29. The apparatus according to claim 25, wherein the power supply for the hoist is also housed in the switch cabinet.

30. The apparatus according to claim 25, wherein the power supply comprises a filter capacitor.

31. The apparatus according to claim 25, wherein a transformer for generating a voltage suitable for the measurement device is also housed in the switch cabinet.

32. The apparatus of claim 25, wherein the power supply includes a filter capacitor.

* * * * *